(12) United States Patent
Slim et al.

(10) Patent No.: US 11,922,224 B2
(45) Date of Patent: Mar. 5, 2024

(54) METHOD FOR INSTALLING A VIRTUALISED NETWORK FUNCTION

(71) Applicant: Orange, Paris (FR)

(72) Inventors: Farah Slim, Châtillon (FR); Gaël Fromentoux, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 525 days.

(21) Appl. No.: 17/253,526

(22) PCT Filed: Jun. 6, 2019

(86) PCT No.: PCT/FR2019/051362
§ 371 (c)(1),
(2) Date: Dec. 17, 2020

(87) PCT Pub. No.: WO2019/243700
PCT Pub. Date: Dec. 26, 2019

(65) Prior Publication Data
US 2021/0133004 A1 May 6, 2021

(30) Foreign Application Priority Data

Jun. 18, 2018 (FR) ...................... 1855333

(51) Int. Cl.
*G06F 9/455* (2018.01)
*G06F 9/50* (2006.01)
*H04L 67/10* (2022.01)

(52) U.S. Cl.
CPC ........ *G06F 9/5077* (2013.01); *G06F 9/45558* (2013.01); *G06F 2009/45595* (2013.01); *H04L 67/10* (2013.01)

(58) Field of Classification Search
CPC ..................................................... G06F 9/5077
(Continued)

(56) References Cited

U.S. PATENT DOCUMENTS 9,760,428 B1 * 9/2017 Felstaine ............... H04W 28/00
10,063,630 B2 * 8/2018 Kim ....................... H04L 67/51
(Continued)

FOREIGN PATENT DOCUMENTS

CN       105808316 A    7/2016
WO    WO 2017/002921 A1   1/2017

OTHER PUBLICATIONS

International Search Report and Written Opinion dated Aug. 26, 2019 for Application No. PCT/FR2019/051362.
(Continued)

*Primary Examiner* — Mehran Kamran
(74) *Attorney, Agent, or Firm* — Knobbe, Martens, Olson & Bear, LLP (57) ABSTRACT

A method is described for installing a virtualized network function. The method is implemented in a service operating entity, and contributes to the implementation of a communications service, in a first data center of a group of data centers of a virtualized communications architecture, on the basis of a profile defined by a set of virtualized network function placement parameters specific to the type of virtualized network function. The profile, obtained from a profile management entity, is used to determine the first data center of the group. The identifier of the data center is then added to the profile and is transmitted to an administration entity of the virtualized architecture with a request for installation of the virtualized function in the determined first data center.

14 Claims, 4 Drawing Sheets

(58) Field of Classification Search
USPC .......................................................... 718/1
See application file for complete search history.

(56) References Cited

U.S. PATENT DOCUMENTS

| | | | | |
|---|---|---|---|---|
| 10,469,317 | B1* | 11/2019 | Jiang | H04L 41/082 |
| 10,733,067 | B1* | 8/2020 | Tandon | G06F 11/2038 |
| 10,999,219 | B1* | 5/2021 | Athreyapurapu | H04L 41/0806 |
| 11,489,873 | B2* | 11/2022 | Lin | H04L 67/10 |
| 11,533,341 | B2* | 12/2022 | Sood | H04L 63/1408 |
| 11,544,096 | B2* | 1/2023 | Elliott | G06F 9/30101 |
| 2012/0166647 | A1* | 6/2012 | Nam | H04L 49/65 709/226 |
| 2013/0212241 | A1* | 8/2013 | Kang | H04L 45/586 709/223 |
| 2014/0059544 | A1* | 2/2014 | Koganty | G06F 9/45533 718/1 |
| 2015/0188780 | A1* | 7/2015 | Spieser | H04L 43/12 370/252 |
| 2016/0321112 | A1* | 11/2016 | Iwashina | G06F 9/45558 |
| 2016/0328258 | A1* | 11/2016 | Iwashina | G06F 9/5077 |
| 2017/0094377 | A1* | 3/2017 | Herdrich | H04Q 9/02 |
| 2017/0351503 | A1* | 12/2017 | Storto | G06F 11/3051 |
| 2018/0004576 | A1* | 1/2018 | Gokurakuji | G06F 9/5077 |
| 2018/0121222 | A1* | 5/2018 | Sharma | G06F 9/45558 |
| 2018/0123870 | A1* | 5/2018 | Xue | H04L 41/0663 |
| 2018/0150288 | A1* | 5/2018 | Shantharam | G06F 9/45512 |
| 2018/0181424 | A1* | 6/2018 | Gokurakuji | G06F 9/5077 |
| 2018/0191838 | A1* | 7/2018 | Friedman | H04L 41/0895 |
| 2018/0316730 | A1* | 11/2018 | Schaefer | H04L 41/28 |
| 2018/0317134 | A1* | 11/2018 | Leroux | H04L 61/5038 |
| 2018/0331909 | A1* | 11/2018 | Zhang | H04L 47/20 |
| 2018/0375726 | A1* | 12/2018 | Xia | H04L 43/20 |
| 2019/0034244 | A1* | 1/2019 | Yang | G06F 9/5077 |
| 2019/0079772 | A1* | 3/2019 | Krishna | G06F 9/3848 |
| 2019/0129745 | A1* | 5/2019 | Wang | G06F 9/45558 |
| 2019/0199611 | A1* | 6/2019 | Kotadia | H04L 47/822 |
| 2019/0280920 | A1* | 9/2019 | Wang | G06F 9/455 |
| 2019/0357084 | A1* | 11/2019 | Chou | H04L 41/0806 |
| 2020/0044919 | A1* | 2/2020 | Yao | H04L 41/0806 |
| 2020/0409743 | A1* | 12/2020 | Ni | H04L 41/0806 |
| 2021/0133004 | A1* | 5/2021 | Slim | G06F 9/5077 |
| 2021/0144056 | A1* | 5/2021 | Chakrapani Rangarajan | H04L 41/5012 |
| 2021/0191784 | A1* | 6/2021 | Rauschenbach | H04L 12/4641 |
| 2021/0200599 | A1* | 7/2021 | Segura Cava | G06F 9/5077 |

OTHER PUBLICATIONS

Slim et al. "Towards a dynamic adaptive placement of virtual network functions Under ONAP" 2017 IEEE Conference on Network Function Virtualization and Software Defined Networks (NFV-SDN), IEEE, Nov. 6, 2017 (Nov. 6, 2017), pp. 210-215.

Slim et al. "Close: A costless service offloading strategy for distributed edge cloud" 2018 15th IEEE Annual Consumer Communications & Networking Conference (CCNC), IEEE, Jan. 12, 2018 (Jan. 12, 2018), pp. 1-6.

* cited by examiner

METHOD FOR INSTALLING A VIRTUALISED NETWORK FUNCTION

RELATED APPLICATIONS

This application is the U.S. National Phase of Application No. PCT/FR2019/051362 entitled "METHOD FOR INSTALLING A VIRTUALISED NETWORK FUNCTION" and filed Jun. 6, 2019, which claims the benefit of French Patent Application No. 1855333, filed Jun. 18, 2018, each of which is incorporated by reference in its entirety.

FIELD OF THE INVENTION

The field of the invention is that of communication architectures based on the implementation of virtualized network functions in distributed architectures.

PRIOR ART

Communication infrastructures are at the current time in the middle of a transformation that is based on emergent technologies such as network function virtualization (NFV) and that consists in decoupling these network functions from the physical equipments implementing them used in current infrastructures. The virtualized network functions are deployed in data centers on servers that are said to be generic, i.e. comprising no features specific to the network functions. Network functions are diverse and may comprise functions such as an S-GW (Serving Gateway), a PDN-GW (Packet Data Network Gateway) an MME (Mobility Management Entity), an NAT (Network Address Translation) or indeed even nonlimitingly a firewall function.

Network-service deployment achieved using a set of virtualized network functions requires the virtualized network functions (VNFs) be placed in virtual machines (VMs) while allowing for constraints, due to the communication-network context, in terms of load, latency, and the availability of the services.

Specifically, the constraints of certain network functions, especially in the data plane (S-GW, RAN (Radio Access Network) functions), in terms of latency require these functions to be deployed near the end user. These constraints have thus incited operators of communication networks to update their infrastructures to meet these requirements, especially by distributing their data centers more widely to PoP (Points of Presence) on the edge of the network. These distributed data centers on the edge of the communication network most often have limited capacities in terms of resources (computation, storage of data and access resources), at the very least with respect to the large data centers deployed centrally by the main data providers of the Internet.

It is recommendable to take into account the limits of distributed data centers on the one hand and the needs of virtualized network functions on the other hand, so that a service, based on chaining of virtualized functions, provides a quality of service that is good enough for the client. The installation of virtualized network functions in data centers must therefore take into account the constraints of the data centers and the needs of the network functions.

The ILP (Integer Linear Programming) optimization techniques described in the document "On orchestrating virtual network functions" (In Network and Service Management (CNSM) 2015 11th International Conference (pages 50-56)) provides a solution to the problem but suffers from scalability problems. Specifically, the solution of the problem for massively distributed infrastructure may take hours, which does not meet the criterion of reactivity specific to communication infrastructures.

The installation of virtualized network functions is most often implemented centrally, especially using a controller that chooses, for the installation of a virtualized network function, the data center that has the most resources available in a predefined region of availability. To make the installation decision, the centralized controller therefore needs to retain a global and real-time view of the available infrastructure resources. This requires information on available resources to be regularly uploaded from data centers to the controller, this occasioning the transmission of "control" streams, which may potentially have an impact on the flow of client data and on the quality of clients' experience.

An offloading mechanism, especially described in the document "CLOSE: A Costless Service Offloading Strategy for Distributed Edge Cloud. GTCC 2017-IEEE Workshop on Game Theory in Computer Communications", has been proposed so that a virtualized network function that has not been able to be installed in a data center is offloaded to a neighboring data center. Selection is solely based on the options as regards neighboring data centers able to accommodate virtualized network functions, no allowance being made for the specificities of the network functions to be installed. In particular, no allowance is made for the compatibility of the functions with a data center such as identified in the document (Network Functions Virtualization (NFV) Release 2; Management and Organization; Network Service Templates Specification) (http://www.etsi.org/deliver/etsi_gs/NFV-IFA/001_099/014/02.01.01_60/gs_NFV-IFA014v020101p.pdf—date: October 2016).

The objective of the present invention is to remedy these drawbacks.

SUMMARY OF THE INVENTION

The invention aims to improve the situation using a method for installing a virtualized network function, contributing to the implementation of a communication service, in a first data center of a set of data centers of a virtualized communication architecture, comprising the following steps implemented in an entity for operating the service:

obtaining a set of placement parameters of the virtualized network function that are specific to the type of said virtualized network function, the set being called a profile, from an entity for managing profiles, determining the first data center of the set depending on the obtained profile, modifying the profile by adding a datum identifying the determined first data center, sending to an entity for administrating the virtualized architecture a request, comprising the modified profile, for installation of the virtualized function in the determined first data center.

A service is composed of a set of virtualized network functions that are chained to one another. To ensure the service has a good quality and a satisfactory availability, it is necessary to install a network function in a data center suitable for the network function and service performed. The match of the suitable data center to the function to be installed depends not only on the nature of the function, which may be identified by a description of the function, but also complementary parameters relative to the type of function. The installing method advantageously allows advantage to be taken of a placement profile allowing the service-operating entity to select the data center depending on parameters present in the profile. The entity for managing profiles intervenes in the installation of a function, thereby enriching the installing method and preventing, for example, a data center from being overloaded or the concentration of network functions contributing to a specific service in a single data center or, in contrast, excluding such a concentration according to affinity rules specific to the types of virtualized network functions. Different virtualized functions may have the same profile if these functions are the same type, i.e. they have characteristics or intrinsic needs (latency, performance, availability, maximum throughput, etc.) that are equivalent or similar. The placement profile associated with a network function in a specific virtualized infrastructure therefore ensures a better availability of the service by matching the selected data center to the type of network function to be installed.

According to one aspect of the invention, the installing method furthermore comprises determining a second data center of the set following reception, from the entity for administrating the virtualized architecture, of a message containing information on non-installation of the virtualized function in the first data center.

In the case where installation cannot be achieved in the determined first data center, the entity for administrating the virtualized infrastructure informs the service-operating entity that the installation has not been able to be achieved so that a second data center is selected for the installation of the function. This allows the success rate of installation of a virtualized function to be improved and prevents a virtualized function from being installed in a data center that could in the end not accommodate it. The presence of information on the first data center in the modified profile makes it possible to avoid selecting the same data center, without having to store the determined data centers in the entity for operating the service.

According to another aspect of the invention, in the installing method, the operating entity increments a counter, indicating the number of times an installation of a virtualized function has not been able to be achieved, in the profile on reception of the message containing the non-installation information.

The incrementation of a counter in the profile allows the operating entity to determine the number of times the entity for administrating the virtualized architecture has failed to install the virtualized function, so as allow management of the allowed installation time and, where needs be, depending on the virtualized function for example, selection of an urgent installation strategy.

According to another aspect of the invention, in the installing method, the entity for operating the service sends an installation incident message to an entity for administrating services if the counter reaches a set value.

If installation is not been possible at the end of a set number of attempts, it is advantageous to inform an administrating entity, for example a BSS (Business Support System) server, so that the latter may request the creation of new capacities in data centers or new data centers.

According to one aspect of the invention, in the installing method, the second data center is in the same geographic region as the first data center.

It is necessary for certain virtualized functions to be installed as close as possible to the clients using the service to which these virtualized functions contribute, especially in order not to have an impact on the quality of service or because the virtualized function processes a high volume of data. Requiring a second data center to be close to the first makes it possible to ensure that the service is implemented with a quality of service that is as satisfactory as would have been the case if the virtualized function were accommodated by the first data center.

According to another aspect of the invention, in the installing method, the placement profile obtained from the entity for managing profiles comprises a datum on compatibility between types of virtualized functions.

Some types of virtualized functions must not be located in the same place as other types of virtualized functions, either to ensure an availability of the service in case of a problem with the data center, or so that types of virtualized functions simultaneously requiring a lot of physical resources, and especially physical resources of the same nature, are not concentrated in one data center.

The compatibility datum is thus taken into account by the service-operating entity to determine a data center compatible with the constraints of the virtualized function to be installed.

According to another aspect of the invention, in the installing method, the profile obtained from the entity for managing profiles comprises a time parameter indicating the maximum duration to be respected for the installation of the virtualized function.

The time parameter indicating the maximum duration to be respected for the type of virtualized function to be installed advantageously allows the various entities involved in the installation of the virtualized function to be able to be informed as to the time limit beyond which installation of the virtualized function must be stopped and, therefore, priorities in the installations of the virtualized functions to be indicated to the entities by means of the time parameter.

According to another aspect of the invention, in the installing method, the profile obtained from the entity for managing profiles comprises a characteristic relative to the capacities required for the installation of the virtualized function.

The various types of virtualized functions have very different characteristics in terms of quality of service, processing of the data, computational power and the choice of one or other data center may advantageously depend on these characteristics.

According to another aspect of the invention, in the installing method, the datum identifying the determined first data center furthermore comprises a datum identifying the virtual machine on which the virtualized function must be installed.

In certain cases, especially if the data centers are more precisely managed for example by virtual machine, it may be advantageous to determine the virtual machine within a data center so as to ensure that the virtual machine is indeed suitable for the type of virtualized function to be installed.

According to another aspect of the invention, the installing method furthermore comprises a step of receiving a message of movement of the virtualized function from an entity administrating the virtualized architecture, prior to the step of obtaining a placement profile.

The method may be implemented to achieve an initial installation of a virtualized function or indeed to move a virtualized function from a first data center to a second data center, because the first data center is no longer suitable for the type of virtualized function or because it is under maintenance or indeed even to improve the placement of the virtualized function depending on its type.

The various aspects of the installing method that have just been described may be implemented independently of one another or in combination with one another.

The invention also relates to a device for installing a virtualized network function, contributing to the implementation of a communication service, in a first data center of a set of data centers of a virtualized communication architecture, implemented in an entity for operating the service and comprising:
- an obtaining module, intended to obtain a set of placement parameters of the virtualized network function that are specific to the type of said virtualized network function, the set being called a profile, from an entity for managing profiles,
- a determining module, intended to determine the first data center of the set depending on the obtained profile,
- a modifying module, able to modify the profile by adding a datum identifying the determined first data center,
- a sender, able to send to an entity for administrating the virtualized architecture a request, comprising the modified profile, for installation of the virtualized function in the determined first data center.

Each and every embodiment of this device is suitable for implementing the installing method that has just been described.

The invention also relates to a system for installing a virtualized network function, contributing to the implementation of a service, in a first data center of a set of data centers of a virtualized communication architecture, comprising:
- an installing device,
- an entity for managing profiles,
- an entity for administrating the virtualized architecture able to receive, from the installing device, a request, comprising the modified profile, for installation of the virtualized function in the determined first data center.

The invention also relates to a computer program, containing instructions for implementing the steps of the installing method that has just been described, when this method is executed by a processor.

This program may use any programming language, and take the form of source code, object code, or code intermediate between source code and object code, such as code in a partially compiled form, or any other desirable form.

The invention also relates to a computer-readable data medium containing the instructions of the computer program such as mentioned above.

The data medium may be any entity or device capable of storing the programs. For example, the medium may comprise a storage means, such as a ROM, for example a CD-ROM or a microelectronic-circuit ROM, or even a magnetic storage means, a hard disk for example.

Furthermore, the data medium may be a transmissible medium such as an electrical or optical signal, which may be rooted via an electrical or optical cable, via radio or via other means. The program according to the invention may in particular be downloaded from a network such as the Internet.

Alternatively, the data medium may be an integrated circuit into which the program is incorporated, the circuit being suitable for executing or for being used in the execution of the method in question.

PRESENTATION OF THE FIGURES

Other advantages and features of the invention will become more clearly apparent on reading the following description of a particular embodiment of the invention, which embodiment is nonlimiting and given by way of simple illustrative example, and the appended drawings, in which.

DETAILED DESCRIPTION OF AT LEAST ONE EMBODIMENT OF THE INVENTION

In the rest of the description, examples of a plurality of embodiments of the invention in a virtualized communication infrastructure essentially based on the specifications of the ETSI (European Telecommunications Standards Institute) and more specifically of the NFV ISG (Network Functions Virtualization Industry Specification Group) are presented; however the invention may also be implemented in other types of virtualized architectures.

Figure 1:
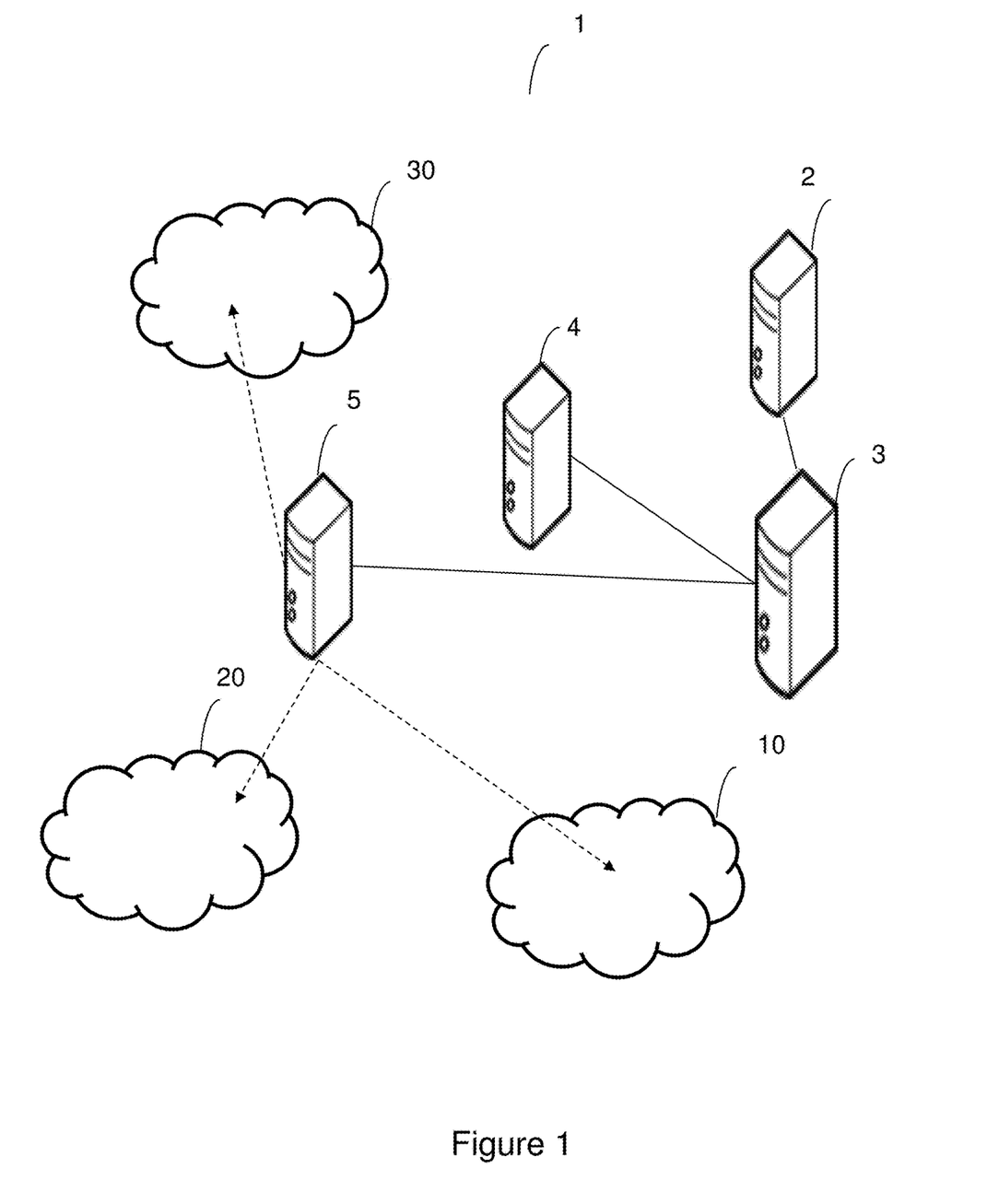
FIG. 1 shows a simplified view of a virtualized communication architecture in which one embodiment of the invention is implemented.

Reference will firstly be made to FIG. 1, which shows a simplified view of a virtualized communication architecture in which one embodiment of the invention is implemented.

The virtualized communication architecture 1 may be a telecommunications network, an enterprise network or any type of infrastructure able to establish communications between terminals or between terminals and servers. The architecture 1 may be a local, regional, national or international network.

Within this virtualized architecture 1, three data centers 10, 20, 30 are deployed. Although, for the sake of clarity, only three centers 10, 20, 30 have been shown in FIG. 1, the infrastructure 1 may comprise a higher number thereof. These data centers comprise physical equipments or servers, comprising virtual machines that allow a plurality of execution environments to be implemented on one and the same physical equipment. This makes it possible to obtain non-specific physical equipments able to accommodate functions installed on the various virtual machines of the physical equipment. The functions are then said to be virtualized because deployed on virtual machines supported by physical equipments. The manager of the architecture 1 is able to install virtualized functions in one of the three data centers 10, 20, 30, of the architecture 1. The virtual functions may irrespectively be data-processing functions (firewall, IP (Internet Protocol) address translation, lawful interception, etc.), functions relative to a mobile network (MME (Mobility Management Entity) component, HSS (Home Subscriber Server), S/PGW (Servicing/Packet Gateway), router or any type of function to be implemented to route data.

Depending on the volume of data that they have to process, on the need for redundancy of these functions and on their criticality in the service delivery, their installation in one or other of the data centers 10, 20, 30 will be best. A device 2 for administrating services and operations is thus deployed in the architecture 1. This device may for example be an OSS/BSS (Operations Support System/Business Support System) server. This device 2 regularly transmits virtualized-function installation (or placement) instructions to the entity 3 for operating the service. The entity 3 is for example an NFVO (Network Function Virtualization Orchestrator) server that manages the life-cycle of the services and that manages the services performed using the various virtualized functions. The entity 4 for managing profiles ensures the association of the profiles with the virtualized functions and transmits the profiles to the entity 3. The entity for managing profiles may be a specific entity or indeed it may be deployed in another server, for example of VNFM (Virtual Network Function Manager) type.

The entity 5 is an entity for administrating the virtualized architecture 1 the role of which is to install the virtualized functions in data centers in light of the information present in the placement profile transmitted by the managing entity 4. This entity 5 may for example be a VIM (Virtualized Infrastructure Manager) entity in charge of the administration of the resources of the architecture 1. The actual installation of a virtualized function in one of the three data centers 10, 20, 30 is controlled by the entity 3, on request by the device 2, based on recommendation by the entity 4, via transmission of an instruction to the entity 5.

Figure 2:
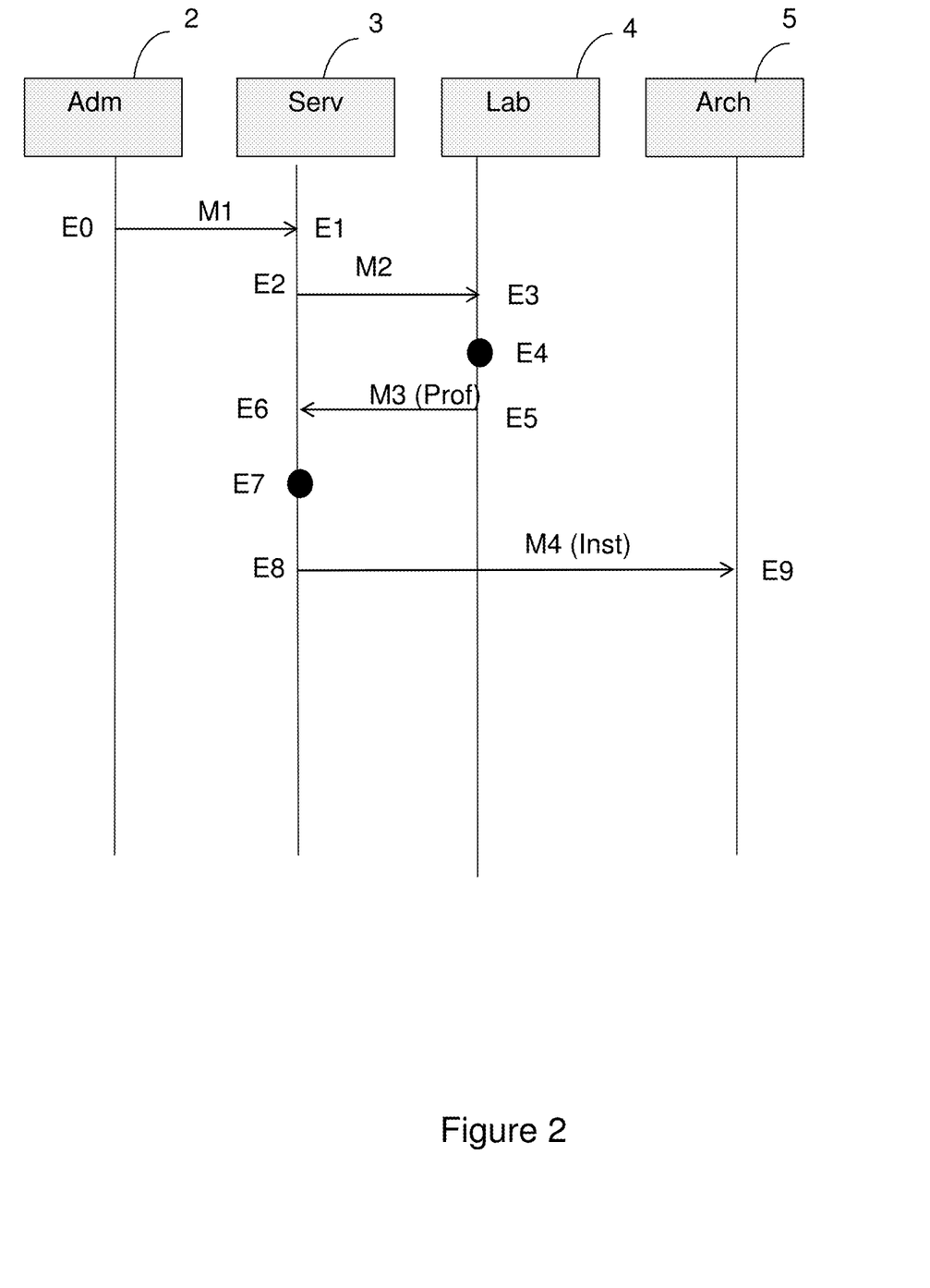
FIG. 2 shows an outline of the method for installing a virtualized function according to a first embodiment of the invention.

With reference to FIG. 2, an outline of the method for installing a virtualized function according to a first embodiment of the invention will now be described.

In a step E0, the device 2 for administrating services and operations transmits, to the entity 3 for operating services, an instruction to install a virtualized function, in a message M1. The device for administrating services transmits such a request, either because a person has configured on the administrating device a new service to be deployed, or because an existing service requires the installation of a new virtualized function, or because the administrating device has received a command from another entity. The need to install a new virtualized function may arise for various reasons managed by the device 2. For example, the device 2 transmits, to the entity 3 for operating services, an instruction to install a virtualized filtering function following a problem with the performance of already installed virtualized functions. The message M1 may irrespectively be an OpenFlow message, an SNMP message or a message based on any type of protocol allowing such an instruction to be transmitted.

On reception of the message M1 in step E1, the operating entity 3 solicits the entity 4 for managing profiles to obtain a profile corresponding to the type of virtualized function to be installed. Specifically, distinct virtualized functions may have characteristics in common and therefore share the same profile because they are of same type. Thus, virtualized functions with the same needs in terms of latency, performance and/or availability may correspond to the same type of virtualized function. The entity 3 transmits, in step E2, a message M2 comprising an identifier of the virtualized function in order to obtain a profile corresponding to this virtualized function. This message M2 may comprise other information (criticality of the function, required performance, etc.) with a view to selecting the profile most suitable for the type of virtualized function. The entity 4 for managing profiles, on reception of the message M2 in step E3, determines, in step E4, a profile corresponding to the type of the function to be installed. This determination may for example consist in using a database associating virtualized functions, associated types of functions and possibly other information (performance, criticality, etc.) relative to placement profiles. Once the profile has been determined, the entity 4 for managing profiles transmits said profile in a message M3 (Prof) in the step E5 to the entity 3 that made the request.

According to one alternative, the obtained profile may especially comprise a datum on compatibility between virtualized functions. This datum may for example be a parameter associated with each virtualized function possibly taking into account the information on performance, on criticality, etc. and providing the operating entity 3 with information on the constraints on placement. For example, a virtualized function with a compatibility datum set to 1 must not to be co-located with a virtualized function the profile of which comprises a compatibility datum set to 2, for example in order to avoid problems with performance that could arise if a data center accommodated these two virtualized functions.

According to another alternative, the obtained profile may furthermore comprise a time parameter allowing an urgency or lack of urgency with which the virtualized function must be installed to be indicated. For example, if it is a question of a new filtering function provided with a view to resolving a problem with security that has arisen in the virtualized architecture, installation of this virtualized function may be urgent and the time parameter, which may correspond to a time in seconds, will have to be respected by the entity 3, even if it means choosing a data-center location that is less optimal but that will allow faster installation respecting the time parameter. In contrast, a less demanding virtualized-function time parameter allows a data center that is better positioned to be selected.

Optionally, the profile may furthermore comprise a characteristic relative to the capacities required for the installation of the virtualized function. Thus, the entity 4 for managing profiles, may indicate, to the entity 3, the capacities required for the installation of the virtualized function and better still select the data center.

On reception of the message M3 in step E6, the entity 3 for operating services is able to determine, in step E7, a data center corresponding to the profile transmitted by the entity for managing profiles. The entity 3 determines, in step E7, a data center in which the virtualized function may be installed. To ensure this determination, the entity knows a set of data centers, their location and their degree of occupancy for example from information regularly transmitted by these data centers or by an entity in charge thereof. The entity 3 determines the data center depending on the information of the profile and on information on the data centers. In the context of an initial deployment for example, the entity 3 may opt for an installation without requiring information on the occupancy of the data centers. According to one alternative, the entity 3 may more specifically determine the virtual machine on which the installation must be installed, this requiring more precise knowledge regarding the data centers and the virtual machines deployed in these data centers.

In the determining step E7, the entity 3 for operating services modifies the profile obtained from the entity 4 for managing profiles by indicating, in the profile, the determined data center, and possibly the virtual machine of the data center, where the virtualized function must be installed.

In step E8, the entity for operating services sends a message M4 (Inst) requesting installation to the entity 5 for administrating the virtualized architecture. This instruction comprises the modified profile, this modified profile comprising the identification of the data center, and possibly of the virtual machine, where the virtualized function is to be installed. On reception of the message M4, in step E9, the entity 5 for administrating the architecture is able to install the virtualized function in the identified data center. The identification of the data center may correspond to a DNS (Domain Name System) record or any type of identifier the meaning of which is well known to the entity 3 and to the entity 4. The virtual machine, in the case where it is also identified in the instruction, may be identified using an IP address or a DNS record.

The virtualized function is then installed by the entity 5 for administrating the infrastructure in a way that is no different to existing solutions, such as for example defined by ETSI. A device of the determined data center may thus download the virtualized function and install it on a virtual machine of the data center or indeed on the determined virtual machine of the data center.

Figure 3:
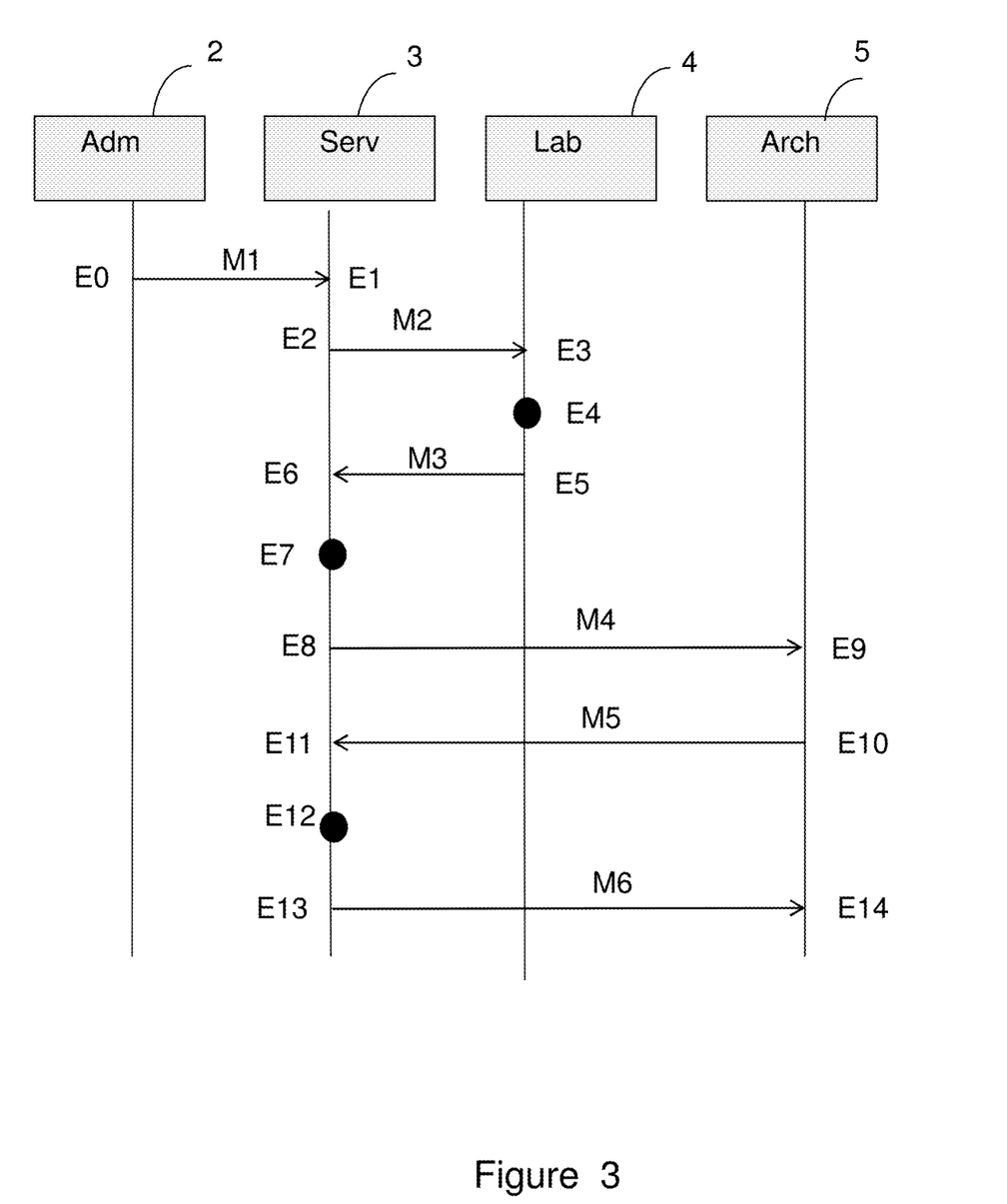
FIG. 3 shows an outline of the installing method according to a second embodiment of the invention.

Reference will now be made to FIG. 3, which shows an outline of the installing method according to a second embodiment of the invention.

Steps E0 to E9 of this embodiment are identical to those of the first embodiment described above.

In step E10, the administrating entity 5 sends a message M5 indicating non-installation of the virtualized function in the data center indicated in the message M4. This non-installation may be for a number of reasons: the data center cannot be identified, the data center cannot accommodate new virtualized functions, the virtualized function to be installed is not compatible with the requirements of the data center. In the case where the virtual machine is also indicated in the message, and in the case where the identified virtual machine cannot accommodate the virtualized function, the entity 5 may install the virtualized function on another virtual machine of the data center or indeed indicate to the entity 3 that the installation cannot be carried out in accordance with the received installation instruction.

On reception of the message M5 in step E11, the entity 3 for operating services increments a counter in the profile. The counter may, according to one alternative, be set to 0 when the profile is sent by the entity for managing profiles then subsequently incremented by 1 each time the virtualized function associated with the profile cannot be installed by the entity 5 for administrating the infrastructure. The incrementation of the counter on each non-installation allows the entity 3 for operating services to change strategy after a certain number of non-installations of a given virtualized function. This may for example consist in informing an administrating entity of the problem with installation of a virtualized function, by transmitting an incident message, or indeed in selecting a default data center necessarily able to accept the virtualized function.

On reception of the message M5, the entity for operating services must furthermore determine, in step E12, another data center where the virtualized function must be installed. According to one alternative, it may once again solicit the entity for managing profiles in order to obtain a new profile associated with the virtualized function. According to another alternative, it may itself determine another data center from the initially transmitted profile. Optionally, it may especially select a data center corresponding to the profile and located in the same geographic region as the first data center determined in step E7. Selection of a data center that is geographically close to the first data center is important especially for virtualized functions that are preferably located close to clients. For example, a virtualized SGW function is preferably located in proximity to clients and geographic location is therefore to be taken into account in the determination of the new data center in step E12.

Once the new data center, and possibly the new virtual machine, have been determined, the entity 3 transmits, in step E13, a message M6 instructing installation to the entity 5 administrating the architecture. The entity 5 installs the virtualized function associated with the profile. These steps correspond to steps E8 and E9. In the case of a new non-installation, steps E11 to E14 are reiterated as many times as necessary, i.e. until the entity 5 installs the virtualized function or indeed until the entity 3 stops the installing method because installation of the virtualized function has failed to many times.

The installing method is also suitable for moving virtualized functions from one data center to another. In this case, the administrating device 2 receives a message of movement of a virtualized function from the entity for administrating the virtualized architecture. This message may especially comprise the data center in which the virtualized function is currently installed, in order to avoid proposing installation in the same data center. Alternatively, the entity 3 for operating services may use a database to avoid selecting the data center in which the virtualized function is currently installed.

This method may be implemented in a system comprising a high number of entities involved in the method, especially depending on the size of the architecture. More particularly, the entity 3 for operating services may interact with a plurality of virtualized-architecture-administrating entities 5.

An example of implementation of the invention in the context of a mobile network of VEPC (Virtualized Evolved Packet Core) type is presented below. In this solution, it is proposed to define a profile that will provide information on all the constraints on placement of virtualized network functions (VNFs). This profile is defined depending on the type of VNF, given that all the VNFs are not subject to the same constraints.

Specifically, a VNF is in general composed of a plurality of components (also called sub-functions or micro-services), that execute tasks located at various network functional levels, some forming part of the data plane, whereas others form part of the network control plane.

MME (Mobility Management Entity) and HSS (Home Subscriber Server) components must be executed in the control plane. S/PGW (Servicing/Packet Gateway) components must be deployed in the data plane. Components of the data plane may have strict requirements in terms of latency, to avoid introducing delays in delivery of data. Components of the control plane are more tolerant in terms of latency. It is therefore necessary to define, in the profile, a latency parameter that depends on the type of VNF (here the type is associated with the control plane or with the data plane, each plane having constraints that are specific thereto).

The origin of the VNF must be known during the process of offloading. It is therefore necessary to define an "origin" parameter, as this will allow loops (offloading of a VNF between the same two data centers a number of times) to be avoided. Certain VNFs are subject to affinity/anti-affinity constraints. These rules establish the relationship between the VNFs and the data centers (certain components must not be executed in the same data center for example). It is proposed to use an "affinity" parameter consisting of a list of data centers that are able to accommodate placement of the VNF while meeting these constraints.

It is necessary, in the process of placement of the VNFs, to know the maximum number of times a VNF may be offloaded before performance in terms of VNF response time begins to degrade. This parameter is also defined depending on the type of VNF.

A TTL (Time To Live) parameter of the request for placement of a VNF is set depending on the type of the VNF in order to indicate the performance required per type of function.

The profile defined depending on the constraints imposed by the type of VNF may be described as follows:
Profile={latency, origin, DCs_eligible, max_offload, TTL_VNFtype}

In the NFV architectural context, for each request for VNF placement obtained from the OSS/BSS (entity for administrating services), the NFVO (entity for operating services) collects the profile corresponding to this type of VNF from an entity called Profile Base (entity for managing labels).

This entity Profile Base takes the type of VNF as parameter and returns the profile corresponding to this type to the NFVO. Once the profile has been collected, the orchestrator determines a data center that matches the profile and modifies the profile with information on the determined data center. The modified profile is then sent with the installation request from the orchestrator to the VIM (entity for administrating the virtualized architecture). The VIM instantiates within the virtualized architecture (NFVI) the resources necessary for the deployment of the VNF while ensuring conformity with the constraints described in the profile.

Figure 4:
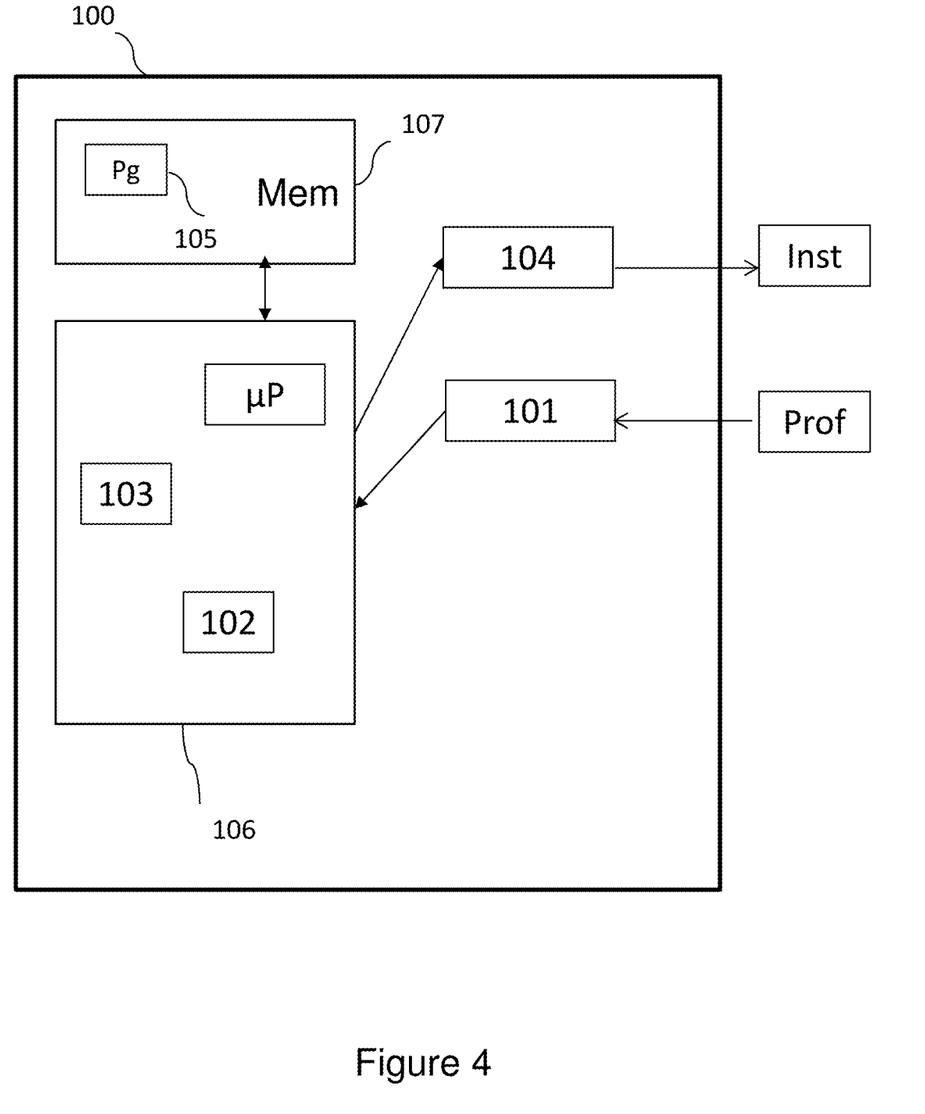
FIG. 4 shows an exemplary structure of a device for xxx according to one aspect of the invention.

With reference to FIG. 4, an example of a structure of an installing device according to one aspect of the invention will now be described.

The installing device 100 implements the installing method, various embodiments of which have just been described.

Such a device 100 may be implemented in a specific entity or indeed be integrated into an existing entity such as an SDN (Software Defined Network) controller or an NFVO entity.

For example, the device 100 comprises a processing unit 106, which is for example equipped with a microprocessor μP, and controlled by a computer program 105 that is stored in a memory 107 and that implements the installing method according to the invention. On initialization, the code instructions of the computer program 105 are for example loaded into a RAM, before being executed by the processor of the processing unit 106.

Such a device 100 comprises:
- an obtaining module 101, intended to obtain a set of placement parameters of the virtualized network function that are specific to the type of virtualized network function, the set being called a profile Prof, from an entity for managing profiles,
- a determining module 102, intended to determine the first data center of the set depending on the obtained profile,
- a modifying module 103, able to modify the placement profile by adding a datum identifying the determined first data center,
- a sender 104, able to send to an entity for administrating the virtualized architecture a request Inst, comprising the modified profile, for installation of the virtualized function in the determined first data center.

The invention claimed is:

1. A method of installing a virtualized network function, contributing to the implementation of a communication service, in a first data center of a set of data centers of a virtualized communication architecture, the method implemented by a service operating entity, the method comprising:
   obtaining a profile from a profile management entity, the profile including a set of placement parameters of the virtualized network function specific to the type of the virtualized network function,
   determining the first data center of the set based on the obtained profile,
   modifying the profile by adding a datum identifying the determined first data center and
   sending a request comprising the modified profile to an entity for administrating the virtualized architecture, for installation of the virtualized function in the determined first data center.

2. The method of claim 1, further comprising determining a second data center of the set following reception, from the entity for administrating the virtualized architecture, of a message containing information indicating that the virtualized function was not installed in the first data center.

3. The method of claim 2, wherein the service operating entity increments a counter, indicating the number of times the virtualized function has not been able to be installed, in the profile on reception of the message containing the non-installation information.

4. The method of claim 3, wherein the service operating entity sends an installation incident message to an entity for administrating services when the counter reaches a set value.

5. The method of claim 2, wherein the second data center is in the same geographic region as the first data center.

6. The method of claim 1, wherein the placement profile obtained from the profile management entity comprises a datum regarding compatibility between types of virtualized functions.

7. The method of claim 1, wherein the profile obtained from the profile management entity comprises a time parameter indicating the maximum duration to be respected for the installation of the virtualized function.

8. The method of claim 1, wherein the profile obtained from the profile management entity comprises a characteristic relative to the capacities required for the installation of the virtualized function.

9. The method of claim 1, wherein the datum identifying the determined first data center further comprises a datum identifying the virtual machine on which the virtualized function must be installed.

10. The method of claim 1, further comprising receiving a message of movement of the virtualized function from an entity administrating the virtualized architecture, prior to obtaining a placement profile.

11. A device for installing a virtualized network function, contributing to the implementation of a communication service, in a first data center of a set of data centers of a virtualized communication architecture, the device implemented in a service operating entity, the service operating entity comprising a processor and a memory, the device configured to:
   obtain a profile from a profile management entity, the profile including a set of placement parameters of the virtualized network function specific to the type of the virtualized network function,
   determine the first data center of the set based on the obtained profile,
   modify the profile by adding a datum identifying the determined first data center, and
   send a request comprising the modified profile to an entity for administrating the virtualized architecture, for installation of the virtualized function in the determined first data center.

12. A system for installing a virtualized network function, contributing to the implementation of a service, in a first data center of a set of data centers of a virtualized communication architecture, the system comprising:
   the installing device of claim 11,
   a profile management entity, and an entity for administrating the virtualized architecture configured to receive, from the installing device, a request comprising the modified profile, for installation of the virtualized function in the determined first data center.

13. A computer comprising a processor and a memory, the memory having stored thereon instructions which, when executed by the processor, cause the computer to implement the method of claim 1.

14. A non-transitory, computer readable storage medium having stored instructions which, when executed by a processor, cause the processor to implement the method of claim 1.

* * * * *